United States Patent [19]
Müller et al.

[11] Patent Number: 6,136,925
[45] Date of Patent: *Oct. 24, 2000

[54] HYDROXYL GROUP-CONTAINING COVALENTLY BOUND POLYMER SEPARATING MATERIALS AND PROCESSES FOR THEIR PREPARATION

[75] Inventors: Egbert Müller, Erzhausen; Margot Mack, Grasellenback; Lothar Britsch, Reute, all of Germany

[73] Assignee: Merck Patent Gesellschaft Mit Beschrankter Haftung, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/836,512
[22] PCT Filed: Oct. 26, 1995
[86] PCT No.: PCT/EP95/04217
    § 371 Date: Jul. 22, 1997
    § 102(e) Date: Jul. 22, 1997
[87] PCT Pub. No.: WO96/14151
    PCT Pub. Date: May 17, 1996

[30] Foreign Application Priority Data

Nov. 4, 1996 [DE] Germany .............................. 44 39 444

[51] Int. Cl.$^7$ .................................. C08F 4/06; C08F 2/16
[52] U.S. Cl. ............................................ 525/247; 525/291
[58] Field of Search ..................... 525/244, 247, 525/268, 269, 291, 54.3

[56] References Cited

U.S. PATENT DOCUMENTS 4,547,463  10/1985  Sakata .
4,617,321  10/1986  MacDonald .
5,021,160  6/1991   Wolpert ............................. 210/500.35

OTHER PUBLICATIONS

EPA 0259037 Mar. 9, 1988.

*Primary Examiner*—Christopher Henderson
*Attorney, Agent, or Firm*—Millen, White, Zelano & Branigan, P.C.

[57] ABSTRACT

The invention relates to separating materials based on supports containing hydroxyl groups, whose surface [sic] are coated with covalently bound polymers, and to processes for their preparation. The separating materials are characterized in that the polymers consist of identical recurring units of the formula I

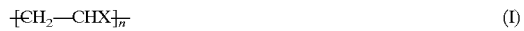 (I)

in which
X is CO—NH—CH$_2$—CH$_2$—SO$_3$H and
n is 2–100.

3 Claims, 1 Drawing Sheet

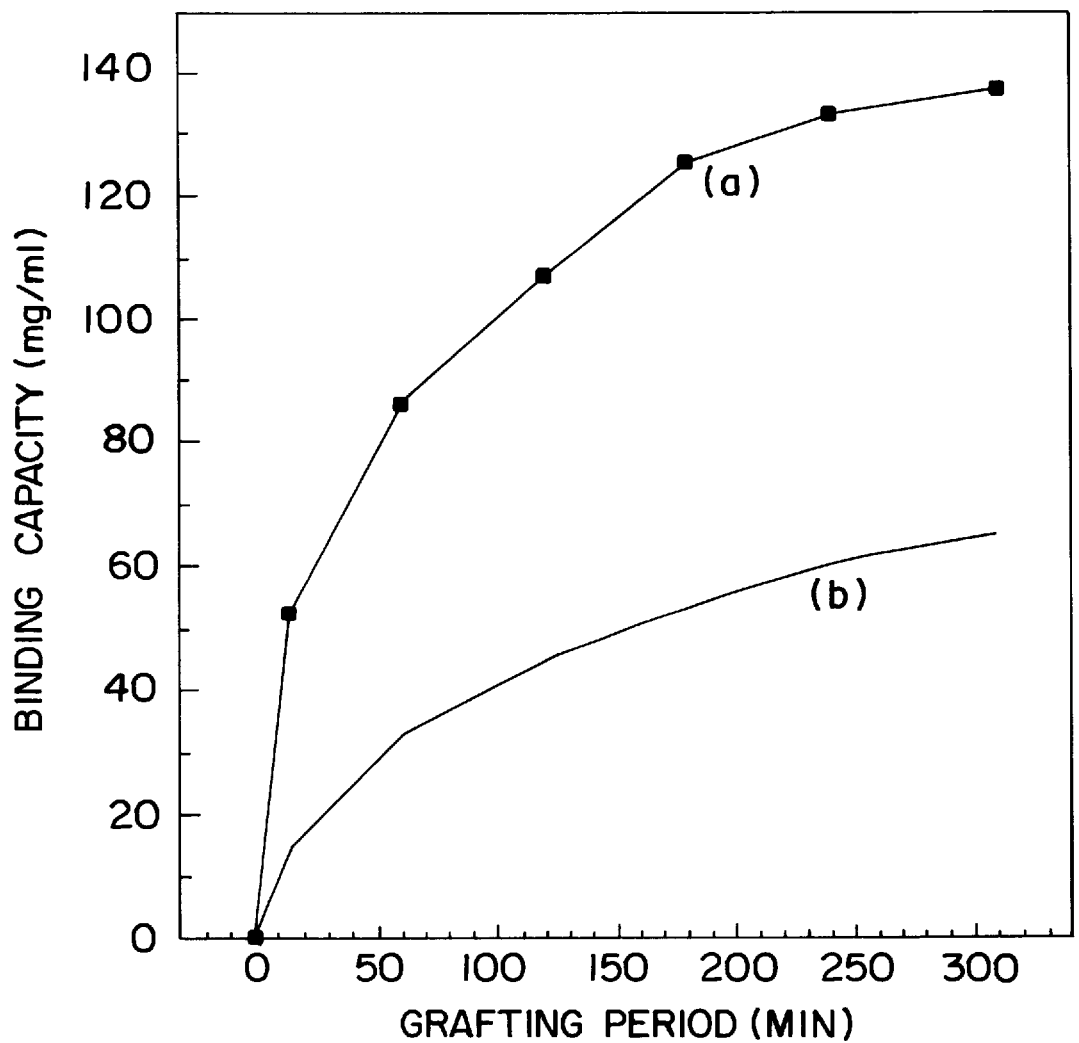
F I G. 1

HYDROXYL GROUP-CONTAINING COVALENTLY BOUND POLYMER SEPARATING MATERIALS AND PROCESSES FOR THEIR PREPARATION

SUMMARY OF THE INVENTION

The invention relates to separating materials based on supports containing hydroxyl groups, whose surfaces are coated with covalently bound polymers, and to processes for their preparation.

The separating materials according to the invention can be employed for the separation of macromolecules, in particular for the fractionation of biopolymers. The separation and purification of biological macromolecules, such as nucleic acids, proteins, enzymes, subcellular units, peptides, monoclonal antibodies or whole cells, has gained great importance with regard to genetic engineering and biotechnology.

For example, the use of ion exchangers for the fractionation of biological macromolecules is known. The conventional materials consist of polymers, such as polymethacrylates, polystyrenes, agarose, crosslinked dextran or silica gels, which carry appropriate functional groups.

EP 337, 144 discloses separating materials based on supports containing hydroxyl groups, whose surfaces are coated with covalently bound polymers, the polymers being identical or different recurring units which are bound to the support by graft polymerization in the presence of cerium (IV) ions.

As a whole, these separating materials are not optimal and, in particular with respect to the preparation process and the grafting yield, still have considerable disadvantages.

The invention is based on the object of making available an optimal separating material which does not have the disadvantages mentioned.

The invention relates to separating materials based on supports containing hydroxyl groups, whose surfaces are coated with covalently bound polymers, which are characterized in that the polymers consist of identical recurring units of the formula I

$$\text{\textemdash}[CH_2\text{\textemdash}CHX]_n\text{\textemdash} \quad (I)$$

in which

X is $CO\text{\textemdash}NH\text{\textemdash}CH_2\text{\textemdash}CH_2\text{\textemdash}SO_3H$ and n is 2–100, preferably 15–50.

The invention further relates to processes for the preparation of these separating materials, which are characterized in that the graft polymerization is carried out in the presence of cerium(IV) ions and of 1 to 3.5 mol/l of inorganic salts in the polyacrylation mixture.

In this case, it is particularly advantageous if the monomers necessary for the polymerization are prepared by reaction of acrylate with aminoethanesulfonic acid in aqueous solution in the presence of a stabilizer and employed directly for the graft polymerization.

Surprisingly, it has been shown that the support materials according to the invention are particularly suitable for high-speed chromatographic separations. The separating materials are universally employable for the ion-exchange chromatography of macromolecules, in particular of biopolymers.

The separating materials according to the invention consist of support particles having hydroxyl groups, onto which is grafted a polymeric material via the α-C atoms of the hydroxyl groups, starting from the monomer sulfoethylacrylamide.

Possible support particles are all generally known porous and nonporous chromatographic supports which have primary or secondary, aliphatic hydroxyl functions on the surface.

Preference is given in this case, for example, to hydrophilic polymers based on acrylate and methacrylate, polymers based on polyvinyl alcohol, diol-substituted silica gels, polysaccharides based on agarose, cellulose, cellulose derivatives or polymers based on dextran. However, it is of course also possible to employ other polymers or copolymers based on monomers such as vinyl compounds, acrylamide, (meth)acrylic acid esters or (meth)acrylonitrile in hydroxylated form.

The performance of high-speed chromatographic separations in so-called downstream processing has recently acquired increasing importance. Two important aspects are in favor, for example in protein purification, of carrying out a high-speed separation: too long a contact of the protein to be purified with the support material leads to a decrease in the biological activity and the proteases released in cell disruption destroy the proteins during a long elution period.

An essential prerequisite for carrying out a high-speed separation, however, is that the protein binding capacity is independent of the linear flow rate. By the construction of particles having continuous pores, materials have been developed for very high-speed chromatography having linear flow rates of greater than 1000 cm/h. Until now it was not known, however, that the type of ligand bound also has an influence on the suitability of a support material for high-speed chromatography.

It has now been found that there is a dependence between the chemical structure of a ligand (in a cation exchanger) and the magnitude of the so-called dynamic protein binding capacity (breakthrough capacity depending on the linear flow).

To determine the dynamic protein binding capacity, the monomer sulfoethylacrylamide was grafted onto Fractogel in the presence of cerium(IV) ions and packed into a column (Superformance® 50–10 mm). As a sample, a solution of 10 mg/ml of lysozyme in phosphate buffer was employed. In this case, it was seen that at a linear flow rate of 720 cm/h the dynamic protein capacity has decreased only by 25.6%. With the same experimental procedure, but using sulfoisobutylacrylamide as a grafted-on monomer, the dynamic protein capacity had decreased by 65.5%. This shows that, surprisingly, the nature of the ligand bound has a great influence on the suitability of a support material for high-speed chromatography.

In addition, it was surprisingly found that the use of higher concentrations of inorganic salts in the mixture for graft polymerization leads to a considerable increase in the grafting yield. This is seen in the case of grafted-on ion exchangers of the substituted polyacrylamide type, inter alia, by a greatly increased dynamic binding capacity for proteins. There results from this surprising effect a hitherto still unknown possibility of control of the achievable ligand density on the inner surface of chromatographic supports and other particulate or membrane-like materials used, which are prepared by graft polymerization onto the base material. This takes effect in particular when using hydrophilic monomers which contain strongly acidic groups, such as in the case of the sulfoethylacrylamide used according to the invention.

The concentration of the inorganic salts in the polyacrylation mixture for the graft polymerization should be in the range from 1 to 3.5 mol/l, preferably 2 to 3 mol/l. In this polymerization, all salts can be used which do not undergo, or only undergo a slight, interaction with the starters used for the initiation of the polymerization, e.g. cerium(IV) ions. Inorganic salts suitable for the process according to the invention are, for example, sodium chloride, sodium perchlorate, sodium sulfate, ammonium sulfate etc., and mixtures of these salts.

By addition of higher concentrations of inorganic salts to the polyacrylation mixture (e.g. 3 mol/l of sodium chloride or 1 mol/l of sodium chloride plus 1 mol/l of sodium perchlorate), for example, the graft yield for sulfoethylacrylamide to Fractogel® HW 65 (S) or Fractogel® HW 65 (M) is increased up to three-fold as opposed to comparable mixtures having lower salt concentrations (1 mol/l of sodium chloride).

BRIEF DESCRIPTION OF THE DRAWINGS

FIG. 1 shows the relation between binding capacity and salt concentration.

In particular, FIG. 1 shows the dependence of the dynamic binding capacity of Fractogel® EMD SE-650 (S) for lysozyme on the duration of polyacrylation in the presence of 3 mol/l of sodium chloride (curve a), of 1 mol/l of sodium chloride or without salt addition (curve b). The mixture size was in each case 2.5 l of gel in 12.5 l total volume. Comparison with mixtures without salt addition shows the marked improvement in the result with respect to the achievable binding capacity for protein. Moreover, it is clear that the reaction conditions determined by incorporation of "grafting kinetics" of this type allows a reproducible control of the protein binding capacity of the product even in the case of change of important components in the batch.

The various inorganic salts have different effects on the grafting yield depending on the ionic species introduced into the polymerization mixture by them. The highest binding capacities of the graft product for lysozyme were obtained by polyacrylation in the presence of 1 mol/l of sodium perchlorate using 200 mg/ml of gel. In this connection, a concentration of 1 mol/l of sodium chloride was additionally present in the reaction mixture as a result of the neutralization of the monomer solution employed which was carried out beforehand. Mixtures in which the addition of sodium perchlorate was omitted, however, achieved maximum binding capacities of 65 mg/ml of gel even with a reaction time extended to 12 hours. Increases in the binding capacity to values between 100 and 180 mg/ml were obtained by addition of sodium chloride, ammonium sulfate and sodium sulfate instead of sodium perchlorate and at concentrations of 1 to 3.5 mol/l.

The preparation of the separating materials according to the invention is carried out by graft polymerization with sulfoethylacrylamide, prepared by reaction of acrylic acid derivatives with aminoethanesulfonic acid. The preferred acrylic acid derivative employed is acryloyl chloride, which freshly distilled and stored at −20° C. in the dark remains suitable for the use according to the invention for approximately two years. For the reaction of acryloyl chloride with aminoethanesulfonic acid, the addition of a stabilizer is necessary. This is added to the acryloyl chloride immediately before use and can then be employed in the acrylation reaction within a few hours and without becoming warmer than 10° C. The sulfoethylacrylamide stabilized in this way is stable as an aqueous solution at temperatures below 10° C. in the dark for several months without detectable adverse changes.

An effective stabilizer according to the present invention has proven in particular to be 4-methoxyphenol. The stabilizer should be employed in the grafting mixture in concentrations of approximately 0.01 to 2 mM.

The aqueous solution of a sulfoethylacrylamide prepared according to this process shows no hint of by-products present on analysis using HPLC. Thus it is also shown that the preceding brief stabilization of the acryloyl chloride by 4-methoxyphenol is to be regarded as adequate for avoiding oligomerization. Surprisingly, the presence of the previously unusual stabilizer during the subsequent graft polymerization does not have an interfering effect on the result of the polymerization.

EXAMPLES

Example 1

Acrylation of aminoethanesulfonic acid

A solution of 50 g of aminoethanesulfonic acid and 32 g of sodium hydroxide pellets in 400 ml of distilled water is cooled to 5° C. in an ice bath. 32 ml of acryloyl chloride, to which 3.85 mg of 4-methoxyphenol are added shortly beforehand, are added dropwise to this solution in the course of one hour such that the temperature does not exceed 8° C. The ice bath is then removed, and the mixture is adjusted to a pH of 4 using 25% hydrochloric acid and stirred for a further hour.

Example 2

Polymerization onto Fractogel®

810 ml of the solution according to Example 1 and the starter solution from 14.5 g of ammonium cerium(IV) nitrate, dissolved in 50 ml of 0.5 M nitric acid, are added to a suspension of 400 ml of Fractogel® HW 65 S and 1200 ml of distilled water which contains 292.2 g of sodium chloride and the mixture is stirred at room temperature for 5 hours. The reaction mixture is filtered with suction with the aid of a P2 glass frit and then washed with the following washing solutions:

500 ml 0.2 M sulfuric acid/0.2 M sodium sulfite, each of distilled water, twice, 0.2 M sulfuric acid, distilled water, twice, 1 M sodium hydroxide solution, distilled water, phosphate buffer, 0.2 M, pH 7.

The gel obtained is added to the 0.2% sodium azide in 0.02 M phosphate buffer (pH 7) are [is], or alternatively stored in 20% ethanol/150 mM sodium chloride.

Instead of 292.2 g of sodium chloride, it is also possible to employ, for example, 330.35 g of ammonium sulfate or 351.15 g of sodium perchlorate.

Example 3

Determination of the dynamic protein binding capacity a) A Superformance® 50–10 mm column is packed with the separating material from Example 2 and 50 ml of a sample of 10 mg/ml of lysozyme in 20 mM phosphate buffer, pH 7, are applied. The eluate was measured at 280 nm with the following results:

| Linear flow rate [cm/h] | mg of lysozyme/ml of packed gel |
|---|---|
| 40 | 57.8 |
| 80 | 55.8 |
| 200 | 54.8 |
| 400 | 49.8 |
| 720 | 43.0 |

The table shows that the dynamic protein binding capacity at a linear flow rate of 720 cm/h with the separating material according to Example 2 has only decreased by 25.6%.

b) The determination is carried out with a separating material which is loaded with sulfoisobutylacrylamide groups instead of sulfoethylacrylamide groups. The procedure was carried out analogously to Example 3a) with the following results:

| Linear flow rate [cm/h] | mg of lysozyme/ml of packed gel |
|---|---|
| 40 | 74.8 |
| 80 | 66.9 |
| 200 | 49.4 |
| 400 | 36.6 |
| 720 | 25.8 |

The results show that at a linear flow rate of 720 cm/h the dynamic protein binding capacity only has a value of 35% of the starting capacity.

What is claimed is:

1. A process for the preparation of a separating material comprising a support having hydroxyl groups, said support having a surface coated with polymers covalently bound thereto, said polymers having recurring units of the formula I

in which

X is CO—NH—CH$_2$—CH$_2$—SO$_3$H and n is 2–100, said process comprising graft polymerization to the support in the presence of cerium(IV) ions combined with 1 to 3.5 mol/l of at least one inorganic salt, which is sodium chloride, sodium perchlorate, sodium sulfate, ammonium sulfate.

2. A process for the preparation of a separating material according to claim 1, wherein the monomer is prepared by reaction of acrylate with aminoethanesulfonic acid in aqueous solution in the presence of a stabilizer and is employed directly for graft polymerization.

3. A process according to claim 2, wherein the stabilizer employed is 4-methoxyphenol.

* * * * *

UNITED STATES PATENT AND TRADEMARK OFFICE
CERTIFICATE OF CORRECTION

PATENT NO. : 6,136,925

DATED : October 24, 2000

INVENTOR(S): Egbert MUELLER et al.

It is certified that an error appears in the above-identified patent and that said Letters Patent is hereby corrected as shown below:

In the Foreign Application Priority Data Section:

Change the filing date of the German priority application to:

November 4, 1994  [DE]  Germany  44 39 444

Signed and Sealed this

Twenty-second Day of May, 2001

Attest:

NICHOLAS P. GODICI

Attesting Officer

Acting Director of the United States Patent and Trademark Office